Dec. 16, 1952     E. P. GANNON     2,621,815
TABLE TRUCK
Filed Nov. 9, 1950     2 SHEETS—SHEET 1
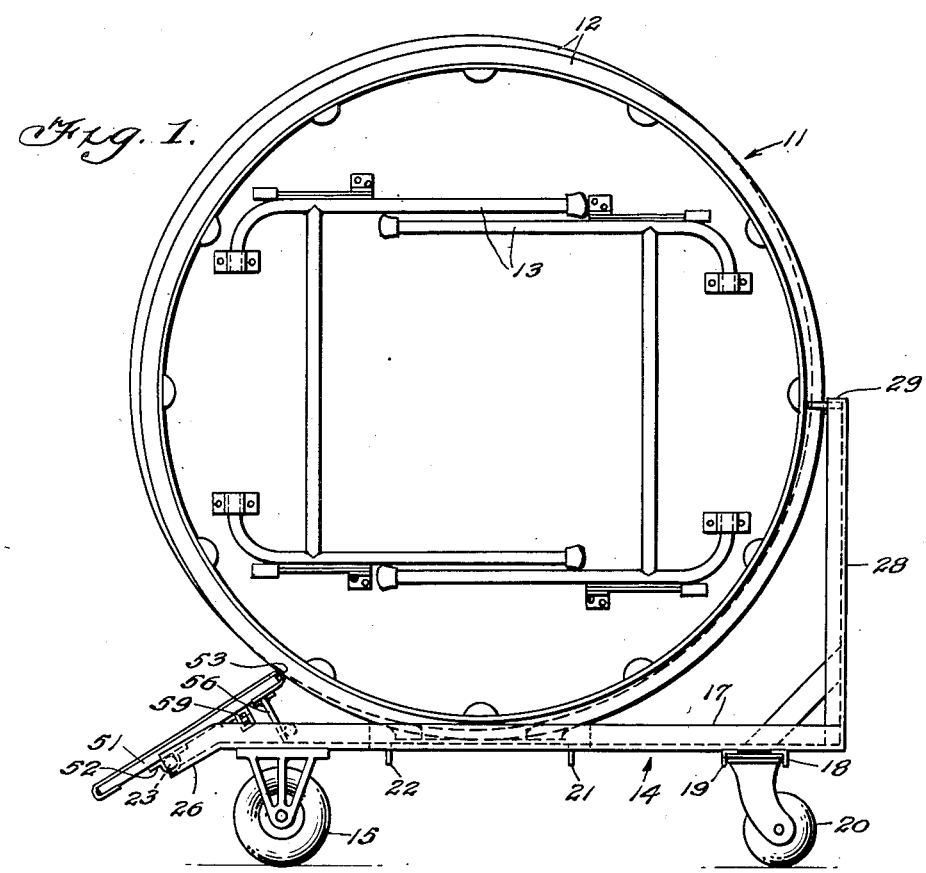
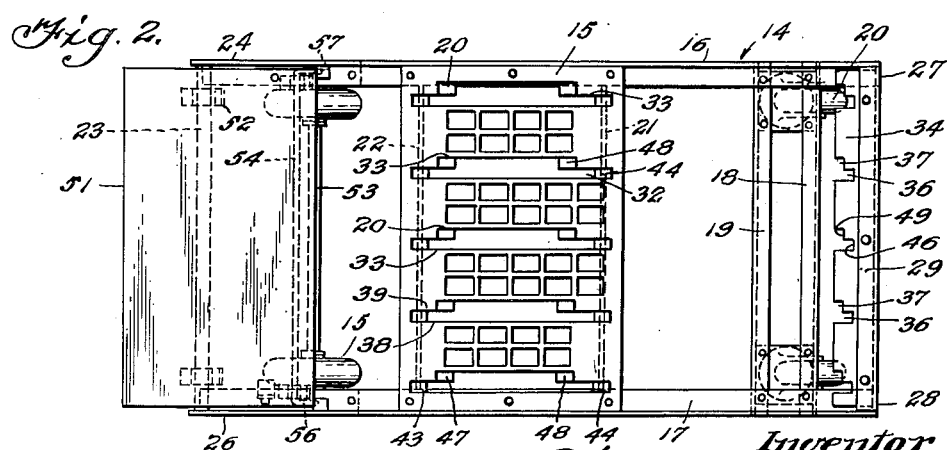
Inventor
Edward P. Gannon
By McCanna & Morsbach
Attorneys Dec. 16, 1952     E. P. GANNON     2,621,815
TABLE TRUCK
Filed Nov. 9, 1950     2 SHEETS—SHEET 2
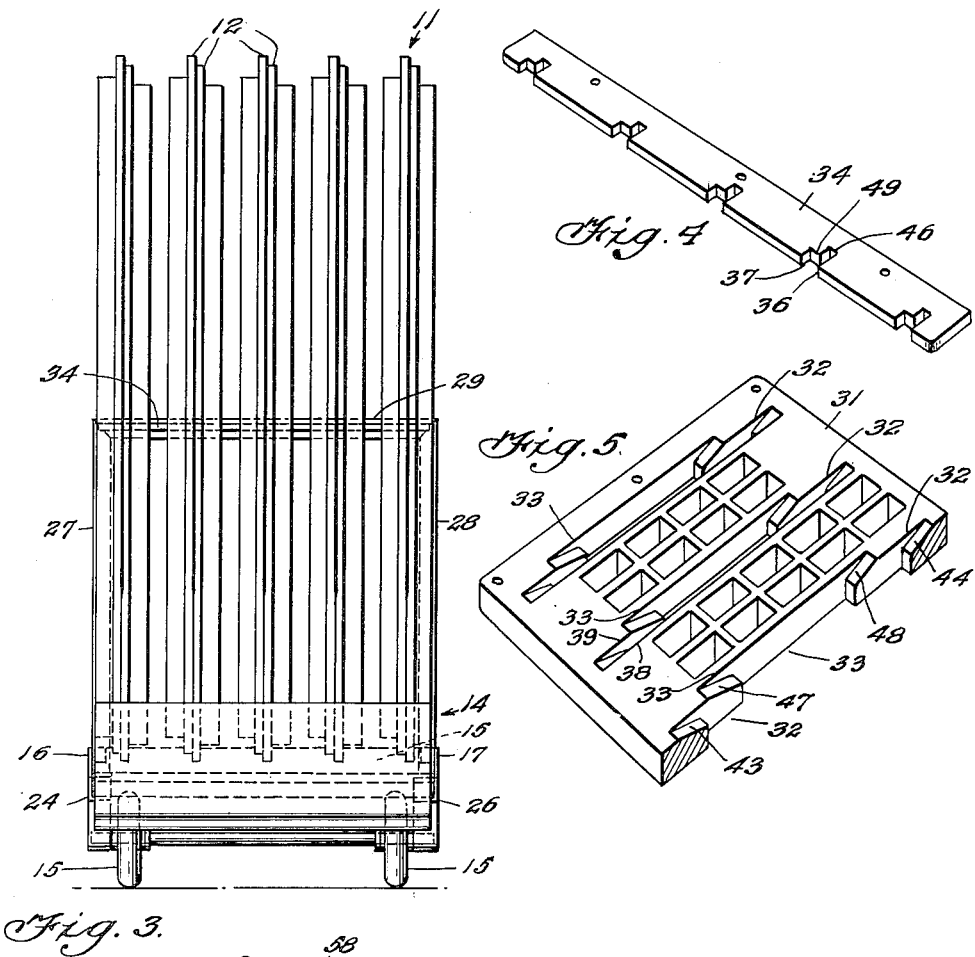
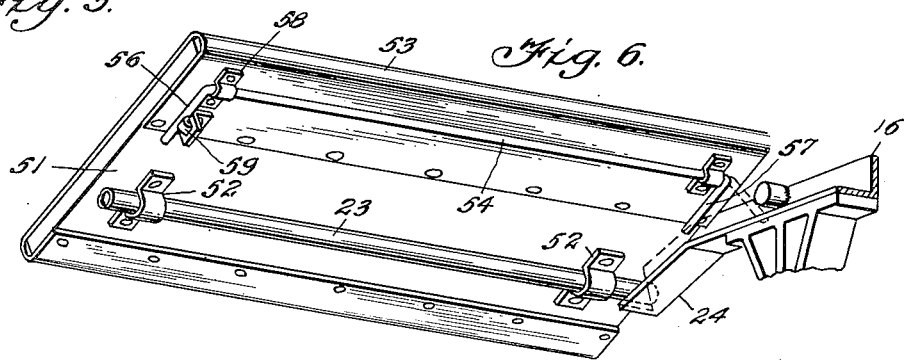
Inventor
Edward P. Gannon
By McKenna & Morlach
Attorneys Patented Dec. 16, 1952

2,621,815

UNITED STATES PATENT OFFICE 2,621,815

TABLE TRUCK

Edward P. Gannon, Rockford, Ill.

Application November 9, 1950, Serial No. 194,840

6 Claims. (Cl. 214—85)

1

This invention relates to table storage trucks.

The storing of tables has always been a troublesome problem insofar as restaurants, caterers, hotels and the like have been concerned. Heretofore tables, particularly circular tables, have been stored in a storeroom by piling the tables one on top of the other or stacking them in side by side relation, one against the other. Whenever it is necessary to set these tables up for a banquet the tables are manually carried or rolled on their edge and are then set up in the banquet room. This procedure means that where the tables are carried, two people are required to handle each table, and if the tables are rolled one person is required for rolling each table from the storeroom to the banquet room. When the tables are taken down it requires the same number of people to handle the tables in transferring them from the banquet room to the storeroom. As is readily apparent this method of handing tables requires a considerable amount of manpower with the resulting expense each time the tables are used. Also this manual handling of the tables is hard on the tables and the result is that the tables are soon damaged quite severely so that they have to be replaced.

An object of this invention is the provision of a truck for handling tables wherein a plurality of circular tables may be stored on the truck and may be transported from place to place with a minimum amount of handling.

Another object of the invention is the provision of a truck for storing a plurality of tables that requires a minimum of floor space for storage purposes.

Another object of the invention is the provision of a truck of the above character with novel means for mounting the tables on the truck.

Another object of the invention is the provision of a truck of the above character having novel means for positively locking the tables in the truck that also forms a ramp upon which the tables may be rolled to facilitate loading and unloading of the truck.

Other objects and advantages of the invention will become apparent from the following detailed description taken in connection with the accompanying drawings, in which—

Figure 1 is a side elevational view of a table truck embodying the present invention with a plurality of tables disposed thereon;

Fig. 2 is a plan view of the table truck shown in Figure 1;

Fig. 3 is an end view of the truck shown in Figure 1;

2

Fig. 4 is a perspective view showing the details of construction of the member supporting the rear edges of the table;

Fig. 5 is a perspective view showing the details of construction of the plate for supporting the bottom edges of the tables, and Fig. 6 is a fragmentary perspective view showing the details of construction of the tail gate.

Referring now to the drawings the invention is shown embodied in a truck for storing banquet tables 11. While these tables may have many different shapes, the table, shown in Figure 1 herein for purposes of illustration, has a circular top 12 with supporting legs 13 pivotally mounted to the bottom of the top so that the legs may be folded against the top as shown in Figure 1 when it is desired to store the table and which may be extended to be at right angles to the table when it is desired to set up the table. As shown, the truck includes a body 14 formed by angle irons 16 and 17 on its sides interconnected by crosspieces 18, 19, 21, 22 and 23. The forward ends 24 and 26 of the sides 16 and 17 are inclined downwardly as shown in Figure 1 and the crosspiece 23 interconnecting these end portions is in the form of a circular rod. At the rear of the body is an upright end portion formed by spaced angle irons 27 and 28 interconnected at one end respectively with the rear ends of the sides 16 and 17 and interconnected at their tops by a crosspiece 29 which forms a handle to which force may be applied in pushing and pulling the truck. Suitable wheels 15 are mounted at the front end of the body while caster wheels 20 are suitably mounted at the back of the body as shown in Figure 1 in a conventional manner.

One phase of the invention is concerned with means on the body for positively supporting the tables in a vertical position on the truck, that permits the tables to be readily independently stacked on the truck from one end thereof and at the same time permits the ready selective removal of the tables from the truck. To this end the body is provided with a horizontally disposed plate 31 with a plurality of slots 32 and 33 shaped to receive the lower edge of the table top 12 and a member 34 supported on the crosspiece 29 having notches 36 and 37 opening on the forward edge shaped to receive the rearwardly facing edge of the table. As seen in Fig. 2 the plate 31 rests on the sides 16 and 17 and the crosspieces 21 and 22 intermediate the ends of the body. As shown, the plate 31 is formed with five elongated slots 32 and with five shorter elongated slots 33 immediately adjacent and opening into the slots 32 respectively as shown. The side walls 38 and 39 of the end portions of the slots 32 are spaced apart to snugly receive the edge of the table therebetween and in effect engage the top and bottom respectively of the table to prevent tilting thereof when the latter is received in the slot 32. The side walls 38 and 39 thus provide lateral support for the table. The ends of the slots 43 and 44 in effect define shoulders or supports engageable at spaced positions on the lower edge of the table when it is disposed in the slot as shown in Figure 1. The shoulders 43 and 44 are so positioned with respect to the notches 36 on the crosspiece 34 that the weight of the table normally urges the table II against the shoulder 46 defined by the bottom of the notch 36. The side walls of the notch 36 are also engageable with the top and bottom respectively of the table and aid in preventing tilting of the table top when the table is supported in a vertical position on the truck.

The slots 33 are located adjacent the slots 32 and are of the same width as the edge of the table and the slot 32. Opposite ends 47 and 48 of the slot 33 define support points engageable with spaced portions of the edge of the table in a manner similar to that described hereinbefore. The shoulders 47 and 48 are so positioned with respect to the notches 37 on the crosspiece 34 that the weight of the table normally urges the table against the bottom of the notches 36 which define shoulders 49. As shown, the shoulders 47 and 48 are arranged with respect to the shoulders 43 and 44 so that the upper and forward edges of a table disposed in a slot 33 projects outwardly from the corresponding edges of the table received in a slot 32. Also the shoulder 49 is slightly forwardly of the shoulder 46. This construction supports a table so that the left hand table of each pair of tables seen in Figs. 1 and 3 projects above and forwardly of the right hand table so that it can be readily grasped. By having the slot 32 adjacent the slot 33 the tables can be stored so that the top of the adjacent tables are in face to face relation and the leg portions of adjacent tables are in face to face relation. This manner of storing the tables minimizes damage to the tops of the tables since there are no projecting surfaces on the tops of the table that will affect or cause marring of the adjacent table top.

To prevent actual displacement of tables from the truck when going over a raised surface or the like, positive locking means is proivded for locking the tables on the truck. As best seen in Figs. 1 and 6 locking means includes a tail gate 51. The latter as best shown in Fig. 6 is pivotally mounted on the rod 23 as by means of straps 52, attached to the underside of the tail gate 51. With this mounting, the tail gate may be swung between an upper position in which its rear edge 53 engages the forward edges of the tables as shown in Figure 1 and thereby positively locks the tables on the truck and a lower position in which the tail gate rests on the inclined portions at the forward end of the truck to define a ramp. A U-shaped brace comprising a bridging portion 54 and spaced legs 56 and 57 is mounted on the underside of the tail gate shown in Fig. 6 by means of straps 58 secured to the underside of the tail gate. The legs 56 and 57 are normally retained across the underside of the tail gate by a latch 59 but may be swung to the dotted line position shown in Fig. 6 so as to support the tail gate in the position shown in Figure 1 whereby it engages the forward edge of the table and locks the table on the truck.

While there is shown one embodiment of the invention, it is to be understood that the slots 32 and 33 could all be of the same dimensions and spaced uninformly across the plate 31 so that the top of one table faces the bottom of the adjacent table. It is to be understood also that a number of different forms of the plate 31 could be utilized. In this embodiment the plate is formed as a casting and to minimize wastage of material the portions of the plate between the notches 32 and 33 are formed as grid work.

The operation in this truck is readily apparent from the drawings but may be summarized as follows: In the normal position of the truck, the legs 56 and 57 of the folding brace are disposed against the underside of the tail gate 51 and the latter rests in the dotted line position shown in Figure 1. To place a table on the truck the operator rolls the table against the forward edge of the tail gate causing the latter to pivot about the rod 23. The tail gate then in effect forms a ramp on which the table may be rolled. As soon as the table clears the rearward edge of the tail gate it rolls on to the plate 31. The operator then aligns the table so that it rolls into one of the slots 32. The table is then positioned so that its rearward edge is also received in a notch 36. When the table is in this position the weight of the table urges the table into engagement with the supports 43, 44 and 46. This table is positively retained in position being given lateral support by the side walls of the notches 36 and the ends of the slot 32. The next table is rolled up the ramp in a similar manner except that the table top faces the table top of the table on the truck. The table is then rolled on the truck until the lower edge is received in the slot 33 and the rearward edge in the notch 49. With this construction the tables will be supported in the manner shown in Figure 1. The remaining tables are then loaded on the truck in the same manner. After completion of the loading operation, the operator grasps the legs 56 and 57 and rotates them to the position shown in Figure 1 and the tail gate is raised so that it engages the forward edges of the tables.

This truck construction may be satisfactorily used with one or any number of tables up to the rated capacity of the truck.

I claim:

1. In a wheeled truck for storing a plurality of circular tables each having a top, bottom and peripheral edge in a vertical position, the combination of a frame, a lower support having recesses adapted to engage the downwardly facing edge of each table adjacent one edge of the truck, an upper support spaced above and to the rear of the lower support and having recesses engageable with the end of each table adjacent the opposite end of the truck, said upper and lower supports being spaced apart less than the diameter of the tables and located to have the weight of the tables normally bias into engagement with the supports, and means engageable with the top and bottom surface of the tables when the latter are in the vertical position for holding the tables against tilting relative to the frame.

2. In a wheeled truck for storing a table in a vertical position, the combination of a frame having a bottom portion, said bottom portion having an elongated slot extending lengthwise thereof and shaped to snugly receive the edge of a circular table, a support member extending transversely of the frame adjacent one end of the frame and spaced above the bottom, said support member having a notch in alignment with the slot shaped to receive the edge of said table, and means for mounting said support on the frame at a location spaced above the frame a distance less than the diameter of the table whereby to position said bottom and notched member to have the weight of the table normally urge said table to seat into said slot and notch.

3. In a wheeled truck for storing a table in a vertical position, the combination of a frame having a bottom portion, said bottom portion having an elongated slot extending lengthwise thereof and shaped to snugly receive the edge of a circular table, a support member extending transversely of the frame adjacent one end of the frame and spaced above the bottom, said support member having a notch in alignment with the slot shaped to receive the edge of said table, means for mounting said support member on the frame to position said bottom and notched member to have the weight of the table normally urge said table to seat into said slot and notch, and locking means on the forward end of the frame movable between a position in which it abuts against the peripheral edge of the table to hold the table in its seated position in the slot and notch and a position in which the table may be rolled from the truck upon the application of force to said table.

4. In a wheeled truck for supporting a circular table in a vertical position, the combination of a body including spaced side members and an upright end portion at one end of and interconnected with said side members, a plate supported by said side members located intermediate the ends of said side members, said plate having a plurality of slots formed thereon extending lengthwise of the frame, said slots being shaped to snugly receive the edge of the table, a cross member rigidly attached to said upright portion having a plurality of notches facing the forward end of said truck and in alignment with said elongated slots, said cross member being positioned above the slotted plate a distance less than the diameter of the table whereby to have the weight of the table normally urge it to seat in aligned slots and notches.

5. The combination recited in claim 4 with a tail gate mounted at the forward end of the frame, means for pivotally mounting said tail gate to be movable between a position spaced above the floor level in which the tail gate engages the forward ends of the tables to positively lock them in the slots and notches and a position also spaced above the floor level in which the tables can be rolled from the truck upon the application of a force thereto, and means for locking said tail gate in its table locking position.

6. The combination recited in claim 4 with a tail gate mounted at the forward end of the frame, and means for pivotally mounting said tail gate to be movable between a position in which it engages the forward ends of the tables to positively lock them in the slots and notches and a position in which the tables can be rolled from the truck upon the application of a force thereto.

EDWARD P. GANNON.

REFERENCES CITED

The following references are of record in the file of this patent:

UNITED STATES PATENTS

| Number | Name | Date |
|---|---|---|
| 614,432 | Austin | Nov. 22, 1898 |
| 1,261,681 | Barnett | Apr. 2, 1918 |
| 1,597,592 | Galloway | Aug. 24, 1926 |
| 1,912,864 | Stannard | June 6, 1933 |
| 2,010,734 | Parker | Aug. 6, 1935 |
| 2,058,184 | Sherrard | Oct. 20, 1936 |
| 2,491,034 | Couch | Dec. 13, 1949 |